United States Patent
Hamilton, II et al.

(10) Patent No.: US 9,032,509 B2
(45) Date of Patent: May 12, 2015

(54) IDENTITY VERIFICATION IN VIRTUAL WORLDS USING ENCODED DATA

(71) Applicant: International Business Machines Corporation, Armonk, NY (US)

(72) Inventors: Rick A. Hamilton, II, Charlottesville, VA (US); Richard J. Newhook, Egg Harbor Township, NJ (US); M. Shafer Ramsey, Westminster, MD (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/950,487

(22) Filed: Jul. 25, 2013

(65) Prior Publication Data

US 2013/0312086 A1     Nov. 21, 2013

Related U.S. Application Data (62) Division of application No. 12/469,729, filed on May 21, 2009, now Pat. No. 8,745,726.

(51) Int. Cl.
| | |
|---|---|
| *G06F 21/31* | (2013.01) |
| *G06F 21/33* | (2013.01) |
| *G09C 5/00* | (2006.01) |
| *H04L 9/32* | (2006.01) |

(52) U.S. Cl.
CPC .............. *G06F 21/31* (2013.01); *G06F 21/335* (2013.01); *G06F 2221/2107* (2013.01); *G06F 2221/2109* (2013.01); *G09C 5/00* (2013.01); *H04L 9/3247* (2013.01)

(58) Field of Classification Search
CPC ....................................................... G06F 21/31
USPC ................. 713/187, 188, 190; 726/18, 19, 20
See application file for complete search history.

(56) References Cited

U.S. PATENT DOCUMENTS

| | | | |
|---|---|---|---|
| 6,229,533 B1 | 5/2001 | Farmer et al. | |
| 8,332,913 B2 * | 12/2012 | Dawson et al. | 726/4 |
| 2003/0014423 A1 | 1/2003 | Chuah et al. | |
| 2004/0143737 A1 | 7/2004 | Teicher | |
| 2005/0171787 A1 | 8/2005 | Zagami | |
| 2005/0257068 A1 | 11/2005 | Cusack, Jr. | |
| 2006/0020630 A1 | 1/2006 | Stager et al. | |
| 2006/0021024 A1 * | 1/2006 | Park | 726/17 |
| 2006/0178966 A1 | 8/2006 | Jung et al. | |
| 2007/0087822 A1 | 4/2007 | Van Luchene | |
| 2007/0245407 A1 | 10/2007 | Lester et al. | |
| 2008/0066181 A1 | 3/2008 | Haveson et al. | |

(Continued)

OTHER PUBLICATIONS

"Avatar Framework Client API"—Oddcast Inc., Jun. 2008 https://www.sitepal.com/pdf/avatar_framework_client_api.pdf.*

(Continued)

*Primary Examiner* — Randy Scott
(74) *Attorney, Agent, or Firm* — Lisa Ulrich, Esq.; Kevin P. Radigan, Esq.; Heslin Rothenberg Farley & Mesiti P.C.

(57) ABSTRACT

An avatar in a virtual world is provided with credentials for access to various parts of the virtual world by embedding information derived from avatar identification and authorized credential information in the form of a graphic image associated with the avatar. The embedded information is preferably encrypted.

15 Claims, 5 Drawing Sheets

(56) References Cited

U.S. PATENT DOCUMENTS

| | | | |
|---|---|---|---|
| 2008/0244712 A1 | 10/2008 | Kitada et al. | |
| 2008/0263458 A1 | 10/2008 | Altberg et al. | |
| 2009/0106347 A1 | 4/2009 | Harwood et al. | |
| 2009/0119764 A1 | 5/2009 | Applewhite et al. | |
| 2009/0178125 A1* | 7/2009 | Barber et al. | 726/6 |
| 2009/0300525 A1 | 12/2009 | Jolliff et al. | |
| 2010/0138755 A1 | 6/2010 | Kulkarni et al. | |
| 2010/0299747 A1 | 11/2010 | Hamilton, II et al. | |

OTHER PUBLICATIONS

Hamilton, II et al., Office Action for U.S. Appl. No. 12/469,729, filed May 21, 2009, (U.S. Patent Publication No. 2010/0299747 A1), dated Nov. 28, 2011 (7 pages).

Hamilton, II et al., Response to Office Action for U.S. Appl. No. 12/469,729, filed May 21, 2009 (U.S. Patent Publication No. 2010/0299747 A1), dated Feb. 23, 2012 (11 pages).

Hamilton, II et al., Final Office Action for U.S. Appl. No. 12/469,729, filed May 21, 2009, (U.S. Patent Publication No. 2010/0299747 A1), dated May 23, 2013 (15 pages).

Hamilton, II et al., Amendment Accompanying Filing of Request for Continued Examination (RCE) for U.S. Appl. No. 12/469,729, filed May 21, 2009 (U.S. Patent Publication No. 2010/0299747 A1), dated Aug. 13, 2012 (12 pages).

Hamilton, II et al., Office Action—Restriction Requirement for U.S. Appl. No. 12/469,729, filed May 21, 2009 (U.S. Patent Publication No. 2010/0299747 A1), dated Feb. 12, 2013 (5 pages).

Hamilton, II et al., Response to Restriction Requirement for U.S. Appl. No. 121469,729, filed May 21, 2009 (U.S. Patent Publication No. 2010/0299747 A1), dated Mar. 7, 2013 (2 pages).

Hamilton, II et al., Office Action for U.S. Appl. No. 12/469,729, filed May 21, 2009 (U.S. Patent Publication No. 2010/0299747 A1), dated May 29, 2013 (7 pages).

Hamilton, II et al., Response to Office Action for U.S. Appl. No. 12/469,729, filed May 21, 2009 (U.S. Patent Publication No. 2010/0299747 A1), dated Jun. 7, 2013 (7 pages).

Hamilton, II et al., Notice of Allowance for U.S. Appl. No. 12/469,729, filed May 21, 2009, (U.S. Patent Publication No. 2010/0299747 A1), dated Aug. 15, 2013 (10 pages).

Wilson, Clay, "Avatars, Virtual Reality Technology, and the U.S. Military: Emerging Policy Issues", http:/lwww.fas.org/sgp/crs/natsec/RS22857.pdf, Apr. 2008 (6 pages).

Knox, Jeremy, "The Avatar in the Mirror: A Lacanian Analysis of the Virtual World Itself", http://online.education.ed.ac.uk.gallery/know_avatar_in_mirrorpdf, Apr. 2009 (6 pages).

\* cited by examiner

IDENTITY VERIFICATION IN VIRTUAL WORLDS USING ENCODED DATA

CROSS-REFERENCE TO RELATED APPLICATIONS

This application is a divisional application from U.S. application Ser. No. 12/469,729, filed May 21, 2009, and entitled "IDENTITY VERIFICATION IN VIRTUAL WORLDS USING ENCODED DATA", published Nov. 25, 2010 as U.S. Patent Publication No. 2010-0299747 A1, and which is hereby incorporated herein by reference in its entirety.

BACKGROUND

The present invention is generally directed to methods for identity verification in virtual worlds. More particularly, the present invention provides a system for providing rapid and secure validation of an avatar's identity and credentials using cryptographically encoded electronic elements. Even more particularly, the present invention is directed to systems and methods for providing avatar identification in a virtual world through the utilization of securely encoded visual information describing an avatar, being positioned on an avatar or otherwise associated with an avatar.

BACKGROUND OF THE INVENTION

Most Virtual Universes are based on proprietary, simple user/password type authentication systems. This may work for the general public and for rudimentary access control, but it is inadequate for support of area-based security access, access credentials, or other virtual universe analogs of physical security mechanisms. For example, if a business entity such as International Business Machines, Inc. (the assignee of the present invention) hosts a number of meeting areas within a virtual universe, with each one being restricted to specific individuals or to individuals with specific clearances, it can be very difficult to provide a real-time method that can immediately validate that a user is permitted into the restricted area.

A virtual world or virtual universe, sometimes designated by the acronym VU, is a computer-based, simulated environment intended for its users to inhabit and to interact with one another therein via avatars. This habitation usually is represented in the form of two or three-dimensional graphical representations of humanoids (or other graphical or text-based avatars). Some, but not all, virtual worlds allow for multiple users.

The world being simulated typically appears similar to the real world, with real world rules such as gravity, topography, locomotion, real-time actions, and communication. Communication has, until recently, been in the form of text, but now real-time voice communication using VOIP is available. This type of virtual world is now most commonly found in massively multiplayer, on-line games (Second Life®, Entropia Universe®, The Sims On-line™, There™), particularly massively multiplayer on-line role-playing games such as EverQuest®, Ultima On-line™, Lineage™, World of Warcraft®, or Guild Wars™.

It should not be assumed that the utility of virtual worlds is limited to game playing, although that is certainly seen to be useful and valuable insofar as it has become a real economic reality with real dollars being exchanged. However, the usefulness of virtual worlds also includes the opportunity to run corporate conferences and seminars. It is also used to conduct virtual world classroom sessions. Governmental and instructional opportunities abound in the virtual world. Accordingly, it should be fully appreciated that the term "virtual" as applied to this technology does not in any way make it less real or less valuable than the "real" world. It is really an extension of current reality. Moreover, it is an extension that greatly facilitates human communication and interaction in a non-face-to-face fashion.

SUMMARY OF THE INVENTION

The present invention provides rapid and secure validation of a person's (Avatar's) credentials and access rights through the creation of an image, animation, or audio transmission that can be worn by the individual (or transmitted upon demand). In one embodiment, the credentials are contained within the pixel (color or gray scale picture element) bitmap which contains the information that describes the individual's credentials and access permissions. In a preferred embodiment, this information is cryptographically encoded such that it is linked to a specific identity, which provides security against tampering. Automated systems or invoked methods process the image and make a determination as to whether or not the individual holds appropriate credentials for the location or security circumstances at hand.

Additional features and advantages are realized through the techniques of the present invention. Other embodiments and aspects of the invention are described in detail herein and are considered a part of the claimed invention. Furthermore, any of the components of the present invention are deployable, manageable, serviceable, etc. by a service provider who offers to include credential information within a bitmap image.

In other words, the present invention provides a method for providing an avatar with credentials. The method comprises at least the following steps: obtaining a digital representation of the avatar's credentials and modifying a visual image associated with the avatar so as to incorporate within the avatar a digital representation of his/her/its credentials.

In one embodiment of the present invention, a data processing system is provided with a memory which includes program instructions for providing an avatar with credentials. The instructions include steps to obtain a digital representation of the credentials and to modify a visual image associated with the avatar so as to incorporate therein the digital representation of the credentials.

Yet another embodiment of the present invention includes a method for deploying an application (or computer program) for providing an avatar with valid credentials in a virtual universe. The method includes, for instance, providing a computer infrastructure being operable to obtain a digital representation of the credentials; and modify a visual image associated with the avatar so as to incorporate therein the digital representation of the credentials.

In another aspect of the present invention there is provided a method for determining that an avatar in a virtual world possesses credentials for accessing secure information in the virtual world. This method includes the step of analyzing a modified visual image associated with the avatar so as to extract therefrom an incorporated digital representation of the credentials.

In still another aspect, a computer readable medium is provided containing thereon program instructions for a data processing system for providing an avatar with credentials. The instructions include steps to obtain a digital representation of the credentials and to modify a visual image associated with the avatar so as to incorporate therein the digital representation of the credentials.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

Note that, throughout this disclosure, for clarity reference is made to an individual or avatar, which is a digital representative of the individual. However, it should be noted that this term not only applies to an individual, but to any computerized processes that may execute on behalf of the individual, using the same credentials and capabilities of the individual that owns/controls the process. In general, this embodies many forms, such as prescheduled, automatically running maintenance processes, system level processes (owned by the system administrator), etc. In all cases, this process is treated like an avatar, with the same inputs and outputs, regardless of whether the credentials come directly from an individual or from a computerized process acting in his or her stead.

Figure 1:
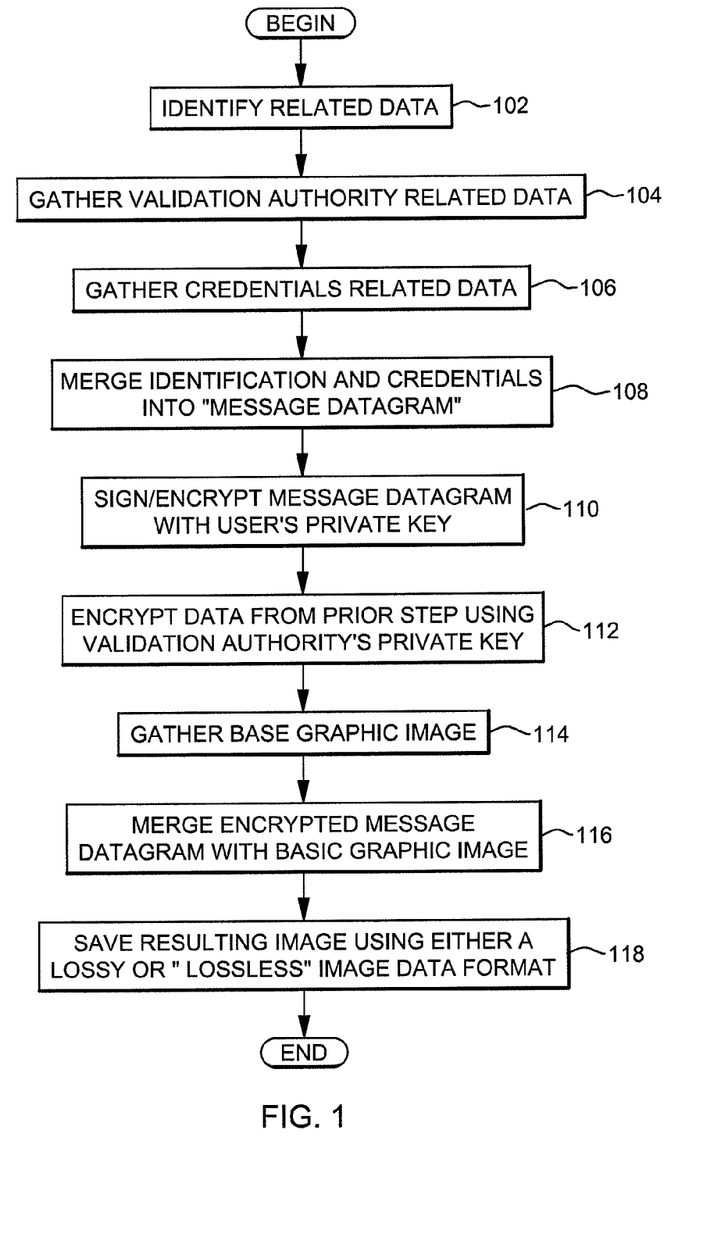
FIG. 1 is a flowchart which illustrates the process by which credential information is encoded.

The present invention is enabled using algorithms that gather the following categories of data:

(1) Identification information: An individual's name, employee serial number, Avatar name, virtual universe ID number, user ID, signature key, avatar name, or other such identifying number. This information is generated via local algorithms at the location of the client code, or may be generated by a certifying authority such as IBM or any other trustworthy source. In the latter case, the information is keyed off of the avatar name, using a privately held key, or other such factors, so as to make the identification information unusable if it were passed to another avatar. In some embodiments, a key is tied to hardware specific or client code specific details, such that authentication could only occur from a given hardware and/or software combination. Many known methods exist for encryption and credential assembly and disassembly, and the extent of such methods used are determined by the stringency of security needs in a given environment. For example, a military VU used for training is accorded with a higher level of security than a game playing VU. Information varies based on what is required to be embedded under specific circumstances and how many data points are required to validate identity for a given region or security requirement. FIG. 1 provides an illustrative example of embedding data into a graphic image. FIG. 1 is discussed in detail below.

(2) Credentials or access control information—These are collection(s) of information that identify the functional capabilities of the individual, or provide core data that is used to ascertain the functional capabilities of the individual. The specific information that is stored is determined by the context in which the access review is being performed. One possible example is the restriction of an area of three dimensional (3D) space; information stored includes data such as the avatar's ID, access levels and/or lists of areas ('yellow zone," "red zone") they may access. In another embodiment, this information is provided from a computerized process that is requesting permission to execute. In these circumstances, the information provided is such data as requested by CPU resource estimates, read/write access, the list of local resources permitting interaction, etc.

Figure 6:
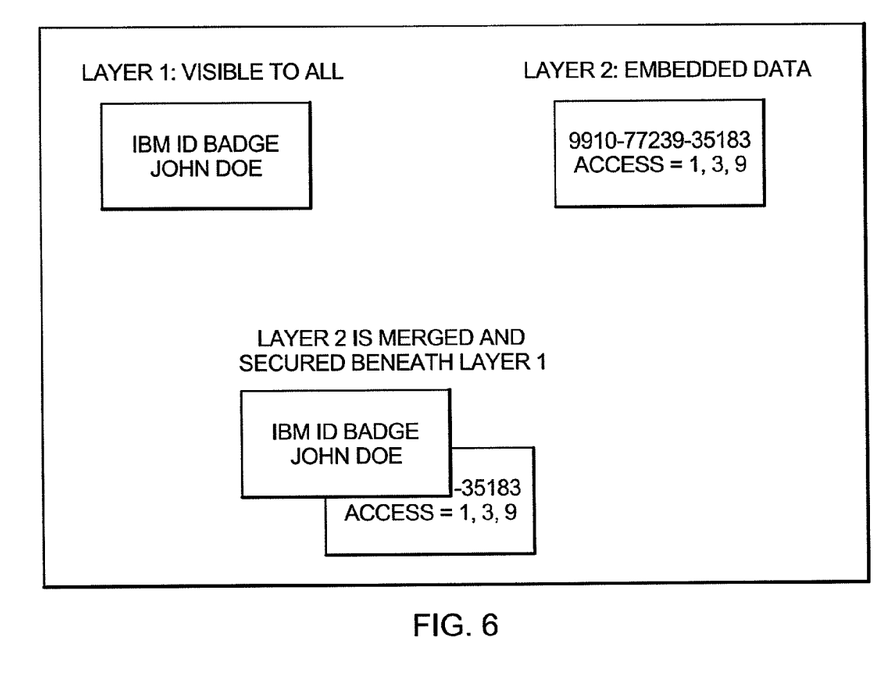
FIG. 6 illustrates the layering aspects of the present invention.

(3) Cryptographic identification information—This is information used to establish proof of ownership of previous items (1) and (2), and to provide tamper resistance to Layer 2 embedded data as shown in FIG. 6. Current standard industry practice is to make use of asymmetric key encryption, which allows data to be encrypted in a method that can be publicly verified as originating from the alleged individual, but which also protects the contents of the data from being viewed, except by the intended recipient. In this case, the recipient is the process that is performing the access verification. In addition, by cryptographically signing the data, any modification to the data (via intentional tampering, or corruption via transmittal for example) would cause an immediate destruction of the credentials, preventing unintended approval of access.

(4) "Carrier Medium"—shown in FIG. 6 as Layer 1. The carrier medium is any form of existing data stream that is used as the medium upon with the encrypted credentials information are embedded. The embedding process is any form of steganographic process, where the data of the credentials information is merged into the carrier medium. The carrier medium is altered in a systematic manner that, upon completion, appears indistinguishable (or nearly so, based on human perception) from the original. However, applying an inverse of the steganographic process used allows the embedded cryptographic data to be once again extracted. One possible example of this is a graphic image, where each pixel of color data is modified to embed a single 'bit' (binary data) of the credentials in the third or fourth bit, that is, in a lower significant bit of the pixel. The resulting graphic image is visually the same (or nearly so) as the original. Another method is the embedding of an audio stream. In this case, the credentials information are embedded as bursts of audio in frequencies that exist outside of the range of human perception. While graphics, images, audio, and video are clear immediate examples, any collection of data that contains sufficient complexity (or "bandwidth") to store the credentials information is a candidate as a carrier medium.

Creating an Image

Identification information and machine-generated data are combined to represent the full credentials packet. The credentials packet is encrypted using a key system generated for the specific image. The key itself is a mix of the user's private key, a virtual universe-specific ID, and the private key of the verification algorithm. This becomes the embedded datagram.

A software (or hardware) routine combines the desired binary bits of the embedded datagram with specific pixels of the starting image, using an algorithm that merges the bits of each pixel with an equivalent bit of the embedded datagram. The resulting bitmap is then converted back to final image form, the resulting image being the full credentials-enabled identification image.

Validating Credentials

A copy of the Image is retrieved from the individual. This retrieval is accomplished through sharing of an item, or use of digital "scan" functionality included in client or server software. Such scan functionality is initiated by either an individual, or pervasively upon entry into a given region. In the latter case, scanning for such images is accomplished via a software abstraction level that sits within the simulation management software.

Using a reverse algorithm as described in paragraph (4) above, the embedded datagram is extracted.

The system attempts to recreate the original key used in paragraph (3) above, using the combination of known private key information and publicly available individual ID information.

The system then attempts to perform the decryption process. If unable to perform decryption, the system immediately returns a failed validation result. If validation fails, the avatar is denied entry or other privileges associated with successful identification.

If decryption is successful, the system compares the credentials information within the datagram to those requested by the user needing validation. If the credentials match, a positive validation result is returned.

The flow charts shown in FIGS. 1 and 2, which are discussed in detail below, depict the general logic flows associated with the present invention.

FIG. 1 illustrates in detail a process for encoding an image associated with an avatar. Typically this image constitutes a graphic which itself represents the avatar. The relevant image that is employed for identification purposes may also constitute a document held by or in the possession of the avatar or even an article of clothing worn by the avatar. Additionally, the message merged with the avatar may also constitute audio or visual data. In particular, in a first step (reference numeral 102), data related to the identity of the avatar is obtained. Next, data related to the validation authorization is gathered (reference numerals 104). The credentials and related data are then gathered (step 106). The identification and credentials data is merged into a message datagram (108). Next the user's private key is used to assign and/or encrypt the message created in step 108. This is done in step 110. Next the result of step 110 is encrypted using the validation authority's private key. The "image" with which the result of step 112 is to be combined is obtained (reference numeral 114). The encrypted message a datagram from step 112 is then merged (step 116) with the basic graphic image from step 114. This merging is typically carried out by means of a steganographic process. The resulting image is then saved in a lossless image data format (step 118).

Figure 2:
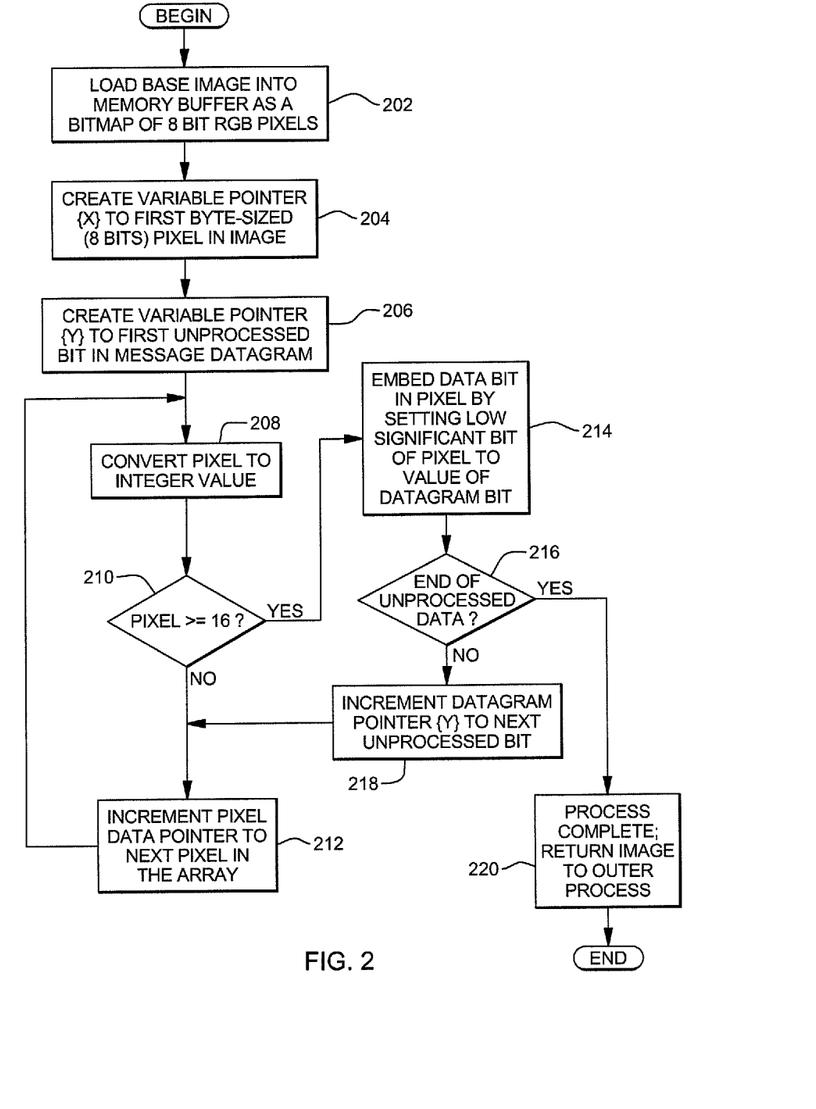
FIG. 2 is a flowchart which illustrates the process by which credential information is decoded.

FIG. 2 illustrates in detail a process for decoding an avatar's image or associated information used for credential validation. The process illustrated in FIG. 2 is exemplary and is not intended to represent anything other than a typical process that is employable to extract the desired information. In particular, in step 202, the base image is loaded into a memory buffer as a bitmap comprising 8-bit RGB pixels. Next, in step 204, a variable pointer is created which points to the first byte sized pixel in the image. Next, in step 206, a variable pointer is created to point to the first unprocessed bit in a message datagram. Next, the selected pixel is converted to represent an integer value in step 208. If the value of this integer is greater than or equal to 16, as determined in step 210, processing continues as set forth in step 214. However, if the integer value is less than 16, the pixel data pointer is incremented so as to point to the next pixel in the array, as set forth in step 212. With respect to step 214, the data bit in the selected pixel is embedded by setting the least significant bit of the pixel to the value in the corresponding datagram bit. If this is the end of the unprocessed data, as determined in step 216, then processing is complete and the image is returned to an outer process (step 220). However, if step 216 determines that it is not the end of the unprocessed data, processing continues with step 218 in which the datagram pointer is incremented so as to point to the next unprocessed bit. It is noted that the value "16" indicated above is a matter of design choice; lesser or greater values may be employed at the convenience of the user or virtual world provider.

Figure 3:
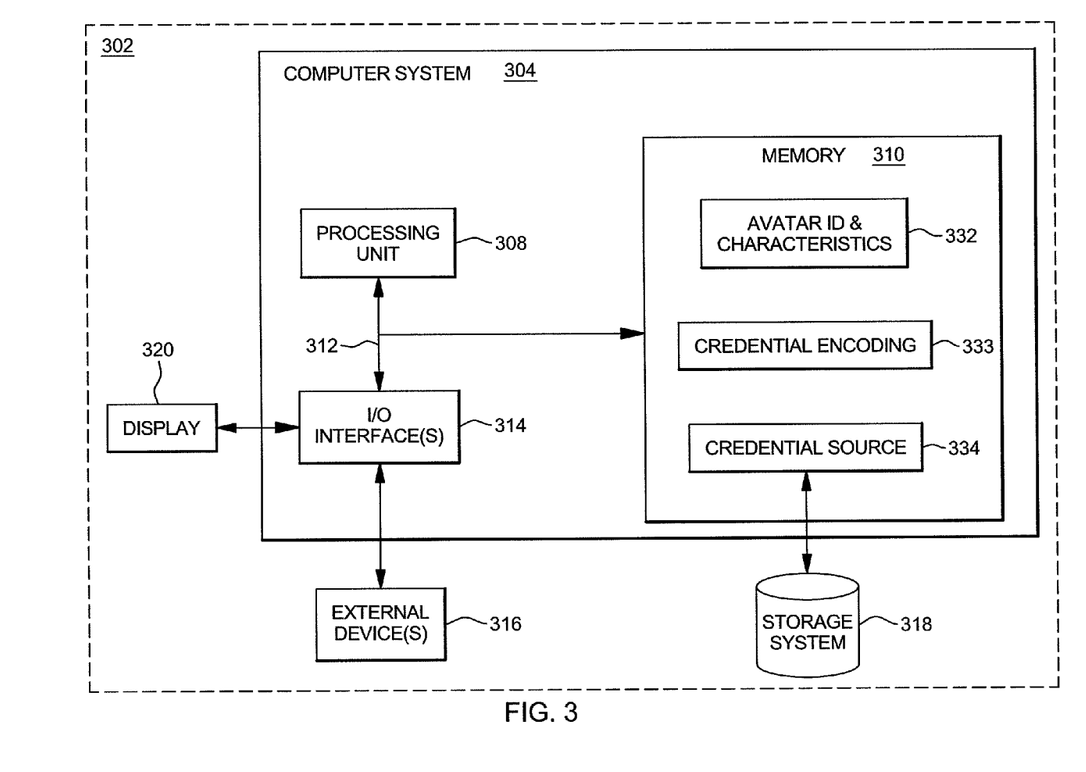
FIG. 3 depicts an illustrative computer system for implementing embodiments of the present invention.

FIG. 3 depicts an illustrative system 302 for providing systems and methods described above relative to providing an avatar with valid credentials in a virtual world environment in accordance with any or all of the embodiments of the present invention. The system includes computer infrastructure 302 that performs the various processes described herein. Computer infrastructure 302 is shown including computer system 304.

Computer system 304 is shown as including processing unit 308, memory 310, at least one input/output (I/O) interface 314, and bus 312. Further, the computer system 304 is shown in communication with at least one external device 316 and storage system 318. In general, the processing unit 308 executes computer program code portions 332, 333 and 334 that are stored in memory 310 and/or storage system 318. Code portion 332 functions to obtain avatar ID and characteristics; code portion 334 functions to access a source of credentials; and code portion 333 functions with code portions 332 and 334 to match the credentials with the avatar and to encode a datagram into an avatar image, as described above. While executing computer program code, processing unit 308 reads and/or writes data from/to the memory 310, storage system 318, and/or I/O interface(s) 314. Bus 312 provides a communication link between each of the components in computer system 304. External device(s) 316 comprise any device (for example, display 320) that enables users to interact with computer system 304 or any device that enables computer system 304 to communicate with one or more other computer systems.

Computer system 304 comprises any general purpose computing article of manufacture capable of executing computer program code installed by a user (for example, a personal computer, server, handheld device, etc.). However, it is understood that the computer system 304 is only representative of various possible computer systems that perform various processes carried out in the practice of the invention. To this extent, in other embodiments, computer system 304 may comprise any special purpose computing article of manufacture comprising hardware and/or computer program code for performing specific functions, any computing article of manufacture that comprises a combination of special purpose and general purpose hardware/software, or the like. In each case, program code and hardware are created using standard programming and engineering techniques, respectively.

Similarly, the computer infrastructure 302 is only illustrative of various types of computer infrastructures that are used to implement the present invention. For example, in one embodiment, computer infrastructure 302 comprises two or more computer systems (for example, a server cluster) that communicate over any type of wired and/or wireless communications link, such as a network, a shared memory, or the like, to perform the various processes of the invention. When the communications link comprises a network, the network comprises any combination of one or more types of networks (for example the Internet, a wide area network, a local area network, a virtual private network, etc.). Additionally, communications between computer systems may utilize any combination of various types of transmission techniques.

It is understood that some of the various systems shown in FIG. 3 may be implemented independently, combined, and/or stored in memory for one or more separate computer systems that communicate over a network. Furthermore, it is understood that some of the systems and/or functionality may not be implemented, or additional systems and/or functionality may be included as part of the system 304.

It is understood that the invention further provides various alternative embodiments. For example, in an embodiment, the invention provides a computer-readable medium that includes computer program code to enable a computer infrastructure to carry out and/or implement the various processes of the present invention. It is understood that the term "computer-readable medium" comprises one or more of any type of physical embodiment of the program code. In particular, the computer-readable medium can comprise program code embodied on one or more portable storage articles of manufacture (for example, a compact disc, a magnetic disk, a tape, etc.), on one or more data storage portions of a computer system, such as memory 310 and/or storage system 318 (for example, a fixed disk, a read-only memory, a random access memory, a cache memory, etc.), and/or as a data signal traveling over a network (for example, during a wired/wireless electronic distribution of the program code).

In another embodiment, the invention provides a business method that performs the processes of the invention on a subscription, advertising, and/or fee basis. A service provider creates, maintains, supports, etc., a computer infrastructure, such as computer infrastructure 302, that performs the processes of the present invention for one or more customers. In return, the service provider receives payment from the customer(s) under a subscription and/or fee agreement and/or the service provider receives payment from the sale of advertising space to one or more third parties.

In still another embodiment, a computer infrastructure, such as computer infrastructure 302, can be obtained (for example, created, maintained, having made available to, etc.) and one or more systems for performing the processes of the invention can be obtained (for example, created, purchased, used, modified, etc.) and deployed to the computer infrastructure. To this extent, the deployment of each system comprises one or more of (1) installing program code on a computer system, such as computer system 304, from a computer-readable medium; (2) adding one or more computer systems to the computer infrastructure; and (3) incorporating and/or modifying one or more existing systems of the computer infrastructure, to enable computer infrastructure 302 to perform the processes of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form including the form of optical or electrical signals transmitted over cable, through a wire or via the "airwaves" or by any combination of these media. The program code may be embodied as one or more types of program products, such as an application/software program, component software/a library of functions, an operating system, a basic I/O system/driver for a particular computing and/or I/O device, and the like.

In another embodiment, the invention provides a business method that performs the process steps of the invention on a subscription, advertising, and/or fee basis. That is, a service provider, such as a Solution Integrator, could offer to endow avatars with encrypted, validly authorized credentials suitable for participation in a virtual universe at an acceptable level for various secure areas. In such cases, a service provider creates, maintains, supports, etc., a computer infrastructure that performs the process steps of the invention for one or more customers. In return, the service provider receives payment from the customer(s) under a subscription and/or fee agreement and/or the service provider can receive payment from the sale of advertising content to one or more third parties.

Figure 4:
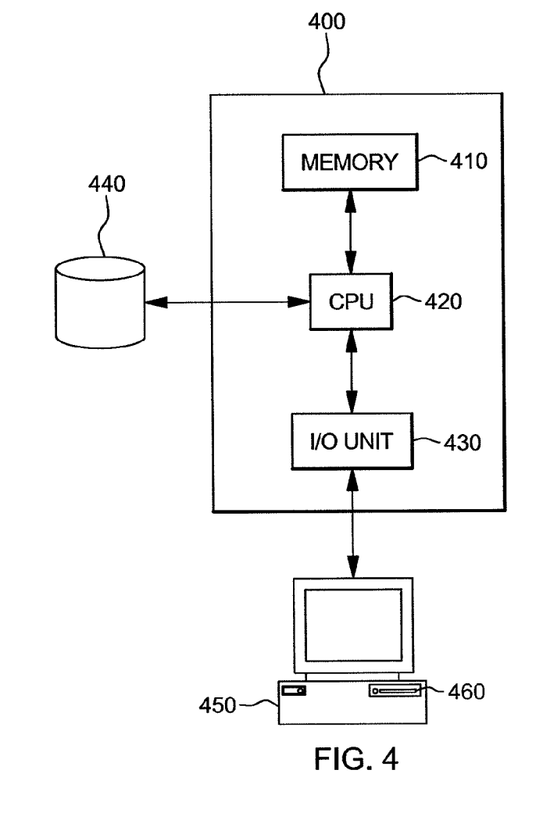
FIG. 4 is a block diagram illustrating a system which an end user typically employs to use the present invention.
Figure 5:
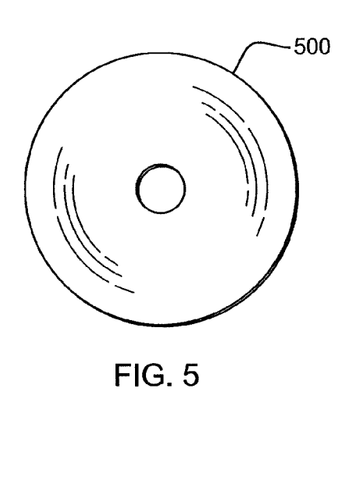
FIG. 5 illustrates one form of machine readable medium, a CD-ROM, on which program instructions for carrying out the steps of the present invention may be provided.

In any event an end user environment in which the present invention operates is shown in FIG. 4. The present invention operates through a data processing environment which effectively includes one or more of the computer elements shown in FIG. 4. While FIG. 4 is more suited for illustrating an end user environment, it is noted that a similar, albeit typically much larger, data processing system is connected via the Internet to the local environment depicted. In particular, a similar non-volatile memory 440 is typically present at the server end to contain program instructions for carrying out the virtual reality program which are loaded into a corresponding main memory 410 for execution. Turning to a local focus, computer 400 includes central processing unit (CPU) 420 which accesses programs and data stored within random access memory 410. Memory 410 is typically volatile in nature and accordingly such systems are provided with non-volatile memory typically in the form of rotatable magnetic memory 440. While memory 440 is preferably a nonvolatile magnetic device, other media may be employed. CPU 430 communicates with users at consoles such as terminal 450 through Input/Output unit 430. Terminal 450 is typically one of many, if not thousands, of consoles in communication with computer 400 through one or more I/O unit 430. In particular, console unit 450 is shown as having included therein a device 460 for reading medium of one or more types such as CD-ROM 500 shown in FIG. 5. Media 500, an example of which is shown in FIG. 5, comprises any convenient device including, but not limited to, magnetic media, optical storage devices and chips such as flash memory devices or so-called thumb drives. Disk 500 also represents a more generic distribution medium in the form of electrical signals used to transmit data bits which represent codes for the instructions discussed herein. While such transmitted signals may be ephemeral in nature they still, nonetheless constitute a physical medium carrying the coded instruction bits and are intended for permanent capture at the signal's destination or destinations.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:
1. A method comprising:
    determining, for a graphic image associated with an avatar in a virtual universe, the graphic image comprising a plurality of pixels forming a pixel bitmap for visually rendering on a graphical display, that the graphic image has embedded therewithin a digital representation of credentials of the avatar to access secure information in said virtual universe, wherein the plurality of pixels of the pixel bitmap have embedded therein at least a portion of the digital representation of the credentials, said determining comprising:
analyzing the graphic image associated with said avatar so as to identify and extract therefrom the embedded digital representation of said credentials.

2. The method of claim 1, wherein the analyzing comprises analyzing the graphic image associated with said avatar so as to extract therefrom a steganographically embedded digital representation of said credentials.

3. The method of claim 1, wherein the graphic image is:
a graphic image of at least a portion of the avatar; or
a visual document associated with the avatar.

4. The method of claim 1, wherein the avatar is wearing an item and wherein the graphic image is an image of the item being worn by the avatar.

5. The method of claim 1, further comprising using the extracted embedded digital representation of the credentials to determine whether functional capability of the avatar is authorized.

6. A computer program product comprising:
a non-transitory computer readable storage medium readable by a processor and storing instructions for execution by the processor for performing a method comprising:
determining, for a graphic image associated with an avatar in a virtual universe, the graphic image comprising a plurality of pixels forming a pixel bitmap for visually rendering on a graphical display, that the graphic image has embedded therewithin a digital representation of credentials of the avatar to access secure information in said virtual universe, wherein the plurality of pixels of the pixel bitmap have embedded therein at least a portion of the digital representation of the credentials, said determining comprising:
analyzing the graphic image associated with said avatar so as to identify and extract therefrom the embedded digital representation of said credentials.

7. The computer program product of claim 6, wherein the analyzing comprises analyzing the graphic image associated with said avatar so as to extract therefrom a steganographically embedded digital representation of said credentials.

8. The computer program product of claim 6, wherein the graphic image is:
a graphic image of at least a portion of the avatar; or
a visual document associated with the avatar.

9. The computer program product of claim 6, wherein the avatar is wearing an item and wherein the graphic image is an image of the item being worn by the avatar.

10. The computer program product of claim 6, wherein the method further comprises using the extracted embedded digital representation of the credentials to determine whether functional capability of the avatar is authorized.

11. A computer system comprising:
a memory; and
a processor in communications with the memory, wherein the computer system is configured to perform a method comprising:
determining, for a graphic image associated with an avatar in a virtual universe, the graphic image comprising a plurality of pixels forming a pixel bitmap for visually rendering on a graphical display, that the graphic image has embedded therewithin a digital representation of credentials of the avatar to access secure information in said virtual universe, wherein the plurality of pixels of the pixel bitmap have embedded therein at least a portion of the digital representation of the credentials, said determining comprising:
analyzing the graphic image associated with said avatar so as to identify and extract therefrom the embedded digital representation of said credentials.

12. The computer system of claim 11, wherein the analyzing comprises analyzing the graphic image associated with said avatar so as to extract therefrom a steganographically embedded digital representation of said credentials.

13. The computer system of claim 11, wherein the graphic image is:
a graphic image of at least a portion of the avatar; or
a visual document associated with the avatar.

14. The computer system of claim 11, wherein the avatar is wearing an item and wherein the graphic image is an image of the item being worn by the avatar.

15. The computer system of claim 11, wherein the method further comprises using the extracted embedded digital representation of the credentials to determine whether functional capability of the avatar is authorized.

* * * * *